United States Patent [19]

Koughan

[11] 4,192,493
[45] Mar. 11, 1980

[54] SHOCK-ABSORBING LINE DEVICE

[76] Inventor: Walter L. Koughan, 18011 NE. 196th St., Woodinville, Wash. 98072

[21] Appl. No.: 942,203

[22] Filed: Sep. 14, 1978

Related U.S. Application Data

[63] Continuation of Ser. No. 812,083, Jul. 1, 1977.

[51] Int. Cl.² .............................................. F16F 1/46
[52] U.S. Cl. ..................................................... 267/74
[58] Field of Search ...................... 267/74, 69, 70, 71, 267/72, 73; 114/205, 213, 215, 235, 242

[56] References Cited

U.S. PATENT DOCUMENTS 3,817,507  6/1974  Derman et al. ...................... 267/74

Primary Examiner—James B. Marbert
Attorney, Agent, or Firm—Jessup & Beecher

[57] ABSTRACT

A shock-absorbing line device comprising a resilient member, preferably in the form of a cylinder, around which a line is spirally wrapped, the two ends of the line passing through respective eyelets at each end of the cylinder. Shock on the line is absorbed by straining the cylinder in torsion and bending, and also compressing or squeezing the cylinder.

2 Claims, 3 Drawing Figures

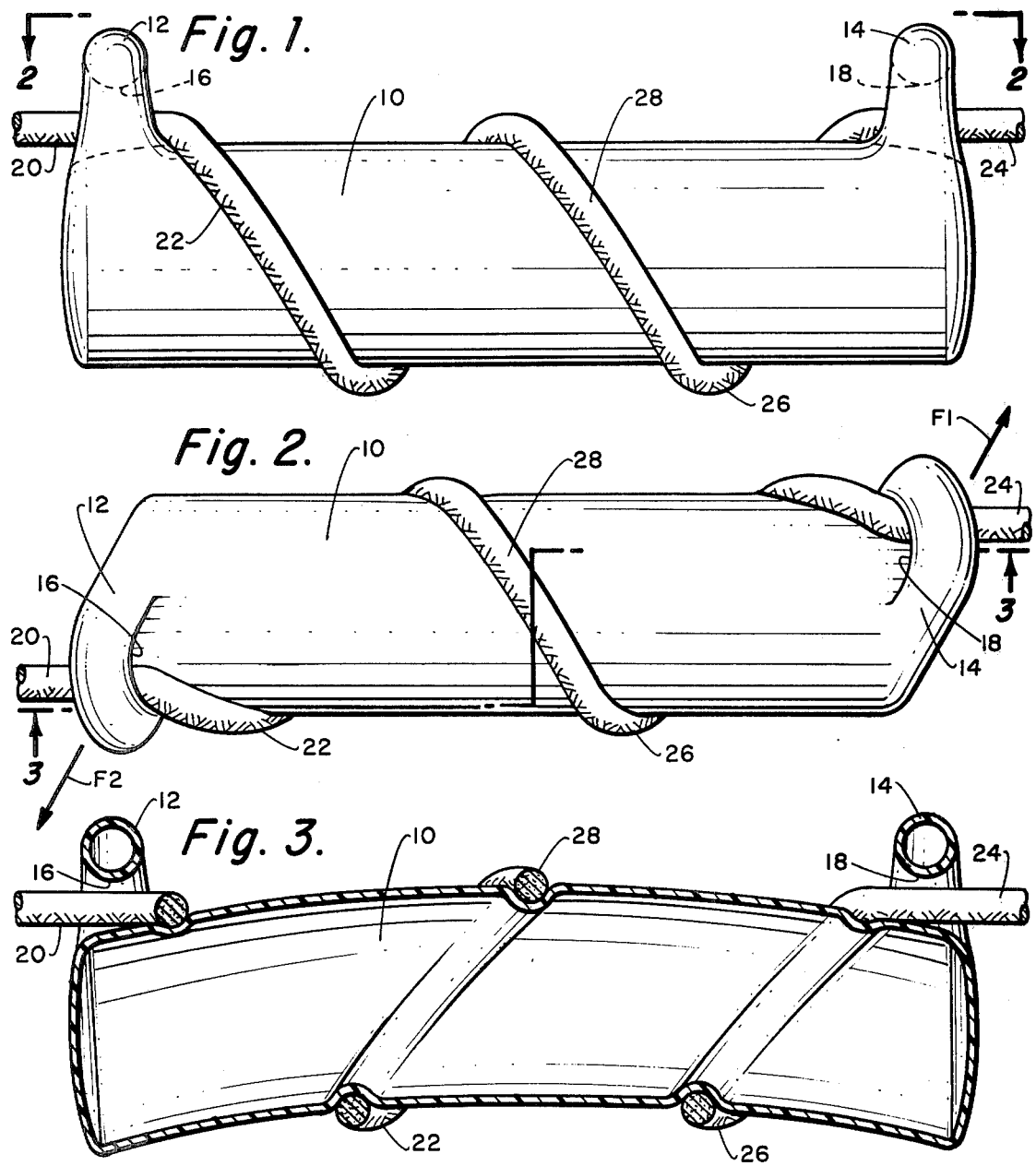

SHOCK-ABSORBING LINE DEVICE

This application is a continuation of application Ser. No. 812,083, filed July 1, 1977.

BACKGROUND OF THE INVENTION

This invention relates to a line shock absorber which is engaged with a line intermediate its two ends in order to resiliently absorb shocks or jerks on the line such as occur in boat docking lines, tow lines and the like. It is also useful as a tensioning device to apply substantially constant tension to a line used as a cargo tie down on vehicles.

BRIEF DESCRIPTION OF THE DRAWINGS

The present invention is illustrated in FIGS. 1 through 4 wherein:

FIG. 1 is a side elevation of a preferred embodiment.

FIG. 2 is a top plan view of the device under strain imposed by tension in the line.

FIG. 3 is a longitudinal section taken along line 3—3 of FIG. 2, showing the absorber device under strain.

DETAILED DESCRIPTION OF THE PREFERRED EMBODIMENT

Referring to the drawing, 10 is a resiliently compressible member in the form of an elastomeric cylinder. In the embodiment shown, the cylinder 10 is hollow and sealed, although it may, if desired, be made of a homogeneous resilient material such as the various elastomeric sponge-like synthetic plastics which are available. Projecting generally radially outward from the axis of the cylinder 10 at each end thereof are flanges 12 and 14, each generally normal to the axis of the cylinder 10. Each flange is perforated to form an eyelet 16 and 18, respectively. A first line 20 passes through the eyelet 16 parallel to the cylinder axis and thence is wound spirally around the cylinder 10, as shown at 22. A second line 24 similarly passes through the eyelet 18 and is wound spirally around cylinder 10, as shown at 26. In practice it is preferred to constitute the two lines 20 and 24 as simply the two sections of a single integral line, the central portion of which is spirally wound around the cylinder 10.

When tension is applied to the line, which in toto will be referred to as line 28, the resilient cylinder 10 is strained in three modes simultaneously: twisting or torsion, bending, and squeezing or compression.

Since the line 28 is free to slide in the eyelets 16 and 18, the resultant force of the line on the eyelet, for example on the eyelet 18 and flange 14, is substantially as shown by the vector F1. Similarly, at the opposite end the force F2 is applied to the cylinder 10 at the flange 12. The radial components of F1 and F2 and the line coils around the cylinder constitute torsional couples which tend to strain the cylinder 10 in torsion, i.e. twist it, as shown in FIG. 2.

Since the flanges 12 and 14 are both offset from the axis of the cylinder 10 and on the same side thereof, the tension in the line 28 also produces a bending strain in the resilient body 10, as shown in FIG. 3. If the flange 14 is positioned diametrically opposite to flange 12, the bending strain is minimized, leaving the torsion as the principal strain in normal use.

Finally, since the line is wrapped around the body 10, which is elastomeric and compressible, the tension in the line 28 also squeezes the resilient body and produces a strain in that mode.

The aggregrate of these three strains constitutes, in the case of a tow or docking line, a shock-absorbing mechanism which minimizes the shock tension in the line 28 which would otherwise be experienced if a sudden jerk occurs on the line. Where the device is used as a tensioning mechanism, as in a tie down line, these strains apply a steady, relatively constant tension to the line.

The longitudinal component of the forces F1 and F2 being offset from the central axis of the resilient body 10, causes the bending shown in FIG. 3.

Where the device is to be used in and around the water, it is preferred to make it floatable, as for example by giving it a hollow interior, as shown in FIG. 3.

The proportioning of the device is not critical, such proportions being determined by the particular use to which the device is to be put. The specific device shown in FIGS. 1–3 has demonstrated quite suitable use as a shock-absorbing device in a docking line for boats, as for example for pleasure boats tied in a marina slip. In such case it has been found quite acceptable to make the cylinder 10 have a length-to-diameter ratio ranging somewhere from 3 to 6. The line 28 may be wound around the cylinder any number of times. In practice the number of spirals has ranged from one to five, although this, of course, is a matter of design preference.

As can be seen in FIG. 1, when the lines 20, 24 are in an unstrained position through the eyelets 12, 14, they are offset from the axis of the cylinder 10. This means that the elastomeric cylinder 10 can absorb a great deal of stress on the lines 20, 24 as tension tends to exert torsional, compressional and bending forces in an attempt to bring the two lines into alignment with the axis of the cylinder, as well as with each other. Further rotational movement of the eyelets 12, 14 allows free slippage of the lines 20, 24, reducing friction and wear on the lines. Prior art devices have the lines substantially along the axis of the cylinder thus reducing the amount of tension which can be absorbed by the cylinder as well as creating greater wear by the rubbing friction of the in-line eyelets which do not give much. In other words, the line shock absorber shown in FIGS. 1–3 has a great deal more give with less frictional wear and force caused by the eyelets allowing greater shock-absorbing capacity than any prior art devices.

By spiralling the line around the cylinder 10, the cylinder is caused to substantially retain its position on the line 28 by friction. By slackening the line 28, it may be readily slid along the line to a new position.

As intimated hereinbefore, the device has a wide range of uses, for example boat tie lines, fish lines, fishing net lines, tow line and shock cords generally. It may also be used for airplane tie down and for vehicle shock and tensioning cords on land, sea and air. Being floatable it will not be lost if accidentally dropped overboard. The floatation permits it to be readily used as an adjustable, but frictionally held, float in a swimming pool dividing rope, such as separates a pool into shallow and deep areas. In such case there is virtually no strain applied to the member, but the friction of the line around the cylinder retains it at a desired position.

What is claimed is:

1. Shock-absorbing line device comprising:
a resilient cylindrical member having an axis;

a first line engaging said member at one end and effective when tensioned to apply a torque to said member about said axis;

a second line engaging said member at the opposite end and effective when tensioned to apply a counter-torque to said member about said axis;

a flange aligned on the same side and substantially normal to said axis at each end of said member, each said flanges having an eyelet passing through it;

each of said lines being passed through the respective eyelet and wound around said member;

said eyelet being substantially larger than the cross-section of said lines, whereby said lines will slide freely in said eyelets;

whereby upon tensioning of said lines, said resilient member is torsionally strained about said axis to absorb shock in said lines.

2. A shock-absorbing line device comprising:

an elongate elastomeric cylinder;

a pair of flanges on each end of said elongate elastomeric cylinder, said flanges being substantially normal to the axis of said cylinder;

an eyelet in each flange at each end of said cylinder;

a line passing through one of said eyelets, spirally wound around said cylinder and through the eyelet in the flange on the opposite end of said cylinder, whereby tension on said line causes torsional, compressional and bending forces, which attempt to align the line with the axis of the cylinder, thereby allowing said line to slip in said eyelets.

* * * * *